Feb. 17, 1970 E. SCHACHNER 3,496,550

DIGITAL PROCESSOR WITH VARIABLE FIELD LENGTH OPERANDS USING A FIRST AND SECOND MEMORY STACK

Filed Feb. 27, 1967 2 Sheets-Sheet 1

Feb. 17, 1970 E. SCHACHNER 3,496,550

DIGITAL PROCESSOR WITH VARIABLE FIELD LENGTH OPERANDS USING A FIRST AND SECOND MEMORY STACK

Filed Feb. 27, 1967 2 Sheets-Sheet 2

INVENTOR.
EUGENE SCHACHNER
BY
Christie, Parker & Hale
ATTORNEYS 3,496,550

DIGITAL PROCESSOR WITH VARIABLE FIELD LENGTH OPERANDS USING A FIRST AND SECOND MEMORY STACK

Eugene Schachner, Los Angeles, Calif., assignor to Burroughs Corporation, Detroit, Mich., a corporation of Michigan

Filed Feb. 27, 1967, Ser. No. 618,646

Int. Cl. G11b *13/00*

U.S. Cl. 340—172.5 5 Claims

ABSTRACT OF THE DISCLOSURE

This invention relates to a digital computer in which operands of variable field length are accommodated. The computer described utilizes a memory stack, i.e., a last in, first out storage, for storing address and field length data on a series of operands specified by the program. Whenever the program specifies an arithmetic operation, the last two addresses in the stack are used to bring two operands of any specified length out of storage. An arithmetic unit performs the operation on the two operands and the resultant is placed in a second memory stack. The address of the resultant in the second stack as well as the field length of the resultant are placed in the first stack, replacing the addresses of the two operands.

BACKGROUND OF THE INVENTION

In Patent No. 3,200,379 there is described an improved digital computer which provides for simplified programming by automatic compiling techniques. This is accomplished by utilizing what is known as a "stack" memory which provides a temporary storage for operands as they are called out of memory by the computer. The stack memory is characterized by the fact that readout of operands from the stack memory is in the reverse order in which they are stored in the memory. Thus the stack memory operates on the basis of "last in, first out." Use of the stack memory as described in the above-identified patent, permits the program to be made up of a string of program syllables which may either call for an operand to be placed in the stack memory from storage or may call for arithmetical or logical operation to be performed on operands in the stack. Since the operands are placed in the stack memory and are retrieved from the stack memory in predetermined order, no addressing is required in connection with an instruction calling for an arithmetic operation. This has the advantage, as pointed out in the above-identified patent, of permitting the machine programming language to conform to the rules of algebraic notation developed by a Polish mathematician, J. Lukasiewicz, which notation has the advantage that it eliminates the need for parentheses in the notation.

The digital computer as described in the above-identified patent is dependent in its operation on use of operands of fixed field length. The present invention is directed to a digital computer utilizing the advantages of the stack memory concept as described in the above-identified patent but which is not limited in its operation to fixed field length operands. The present machine may use fields of any number of characters, thus making it particularly useful for operation in variable field length computers, which operation is a character mode of operation.

SUMMARY OF THE INVENTION

In brief, the present invention is directed to a computer utilizing character mode data of variable field length. The program is arranged to identify two or more operands followed by one or more operators in the manner of parenthesis-free algebraic notation. Two stack memories are provided, one for addresses and one for resultant operands. When the program calls for an operand, the base address and field length of the operand are stored on top of the first stack. Whenever the program calls for an arithmetic operation, the top two addresses in the first stack are used to locate and read out two operands character by character. As the resultant of the arithmetic operation is produced, it is stored character by character on the top of the second stack. When the arithmetic operation is complete, an address pointing to the top of the second stack is stored in the top of the first stack.

BRIEF DESCRIPTION OF THE DRAWING

For a more complete understanding of the invention, reference should be made to the accompanying drawing wherein the single figure is a block schematic diagram of one embodiment of the present invention.

DESCRIPTION OF THE PREFERRED EMBODIMENT

Figure 1A:
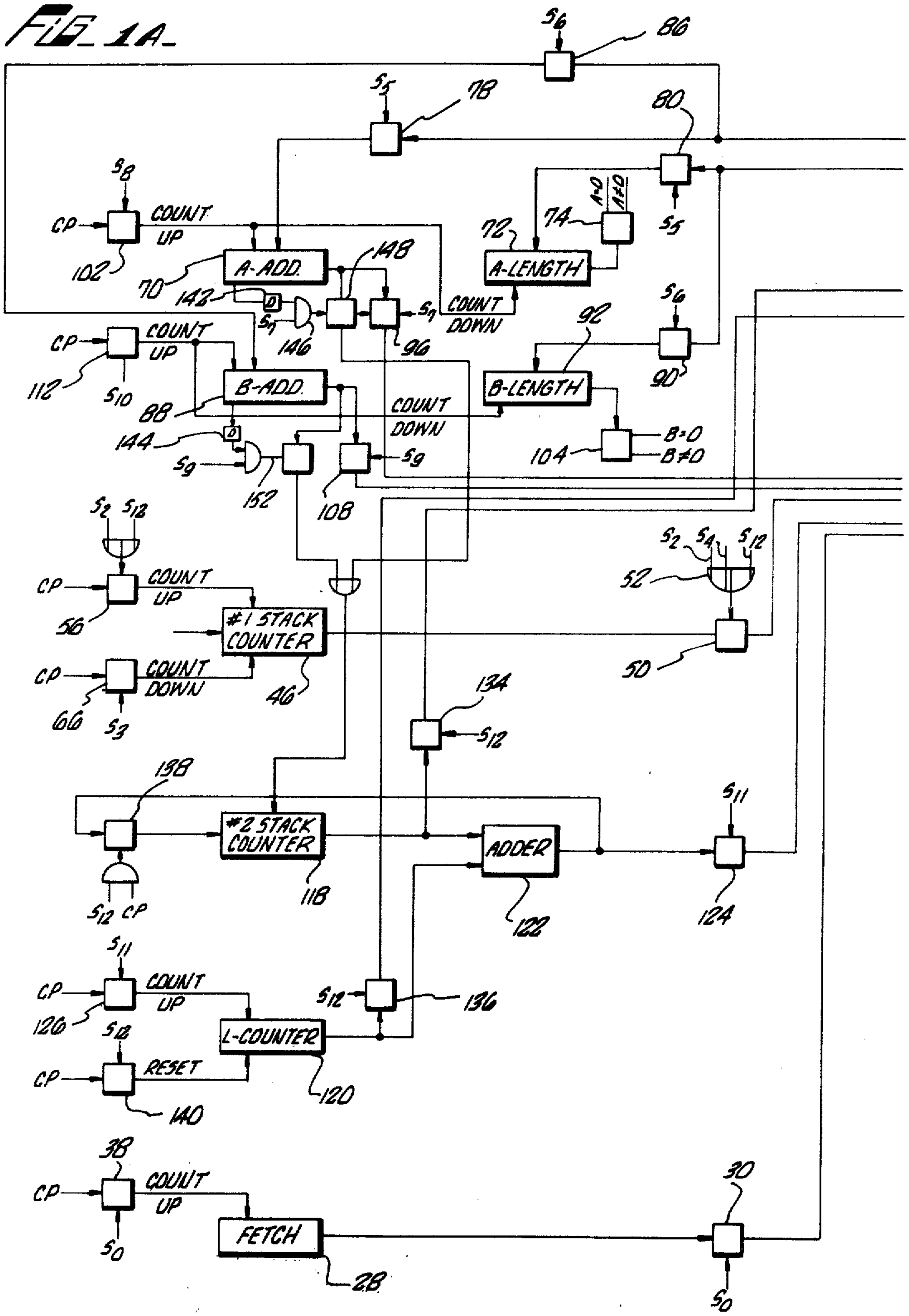
Figure 1B:
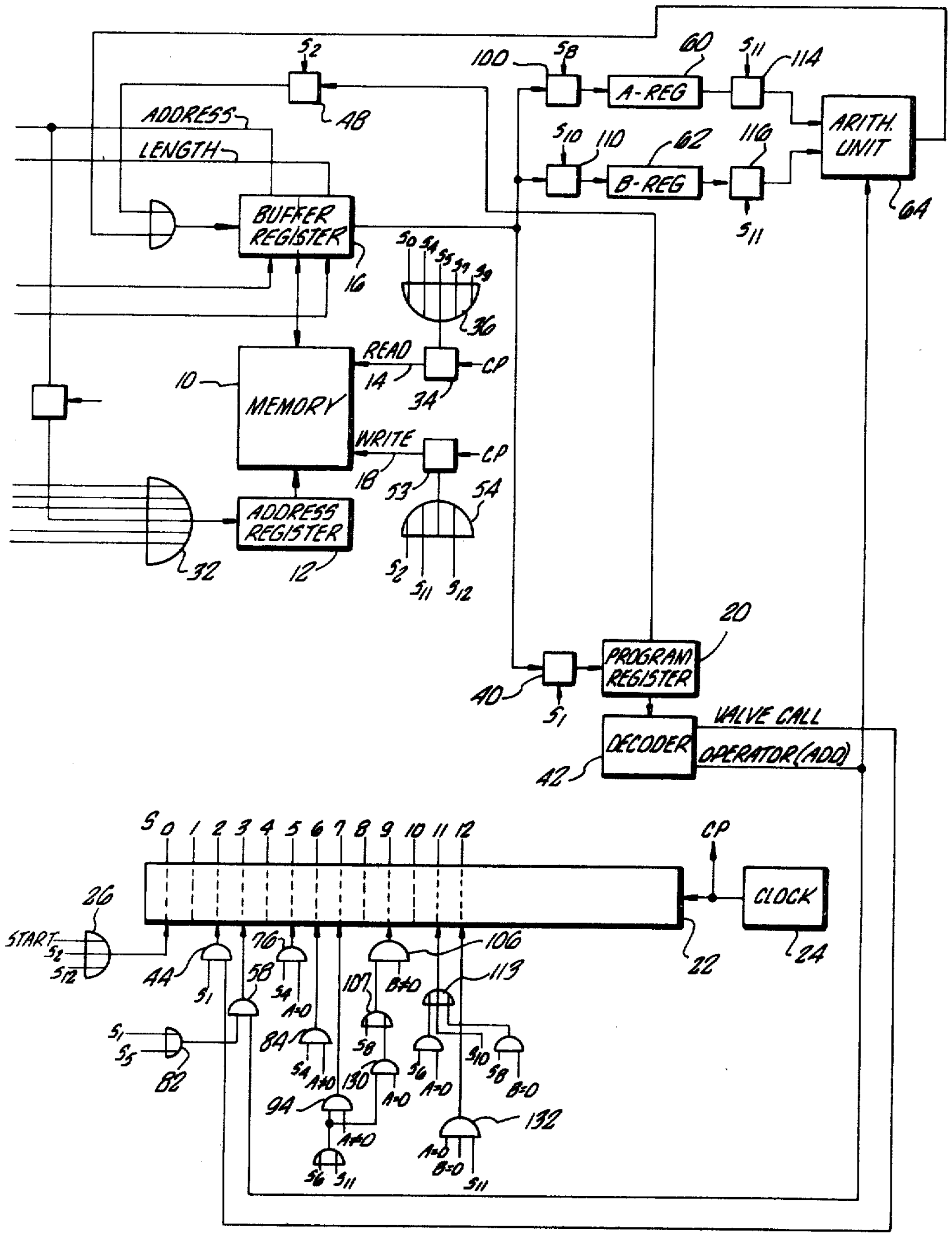

Referring to the drawing in detail, the numeral 10 indicates generally a random access storage, such as a core memory, controlled by an address register 12. In response to a pulse on a READ input 14 to the memory 10, a word is transferred from the address location identified by the address register 12 into a memory buffer register 16. Similarly, a pulse on the WRITE input 18 causes a word in the buffer register 16 to be stored in the location identified by the address register 12. Random access core memories of this type are well known in the art.

As pointed out in the above-identified patent, the program written in machine language is stored in a portion of the memory 10 in the form of a string of addressable syllables which may be of several different types, only two of which are of interest in regard to the present invention. These two syllable types, which may be referred to as Value Call syllables and Operator syllables, are executed sequentially by transferring the syllables in sequence from the memory 10 into the program register 20. The function of the Value Call syllable is to identify an operand stored in the memory 10. Since this is a character mode type machine, the Value Call syllable identifies the base address in memory of the first character or group of characters comprising the operand field and also includes information identifying the length of the operand field. Operator syllables, on the other hand, identify particular arithmetic or logical operations to be performed without reference to any address. The present invention is described in connection with the Operator syllable specifying an arithmetic operation.

Control of the processor in fetching and executing program control syllables is by way of a central control circuit, indicated generally at 22, which is arranged to set to or be sequentially stepped through a plurality of control states designated $S_{0-n}$. Each control state lasts for a period of a clock pulse interval established by a clock source 24 which generates clock pulses, designated CP.

Operation is commenced by applying a Start level through an "or" gate 26 to set the control unit 22 to the $S_0$ state. This causes the contents of a fetch counter 28 to be transferred by an "and" gate 30 in response to the $S_0$ state to the address register 12 through an "or" gate 32. The $S_0$ state is also applied to an "and" gate 34 through an "or" gate 36, permitting the next CP to be gated to the READ input 14 of the memory 10. As a result, the first program syllable which is stored in the memory location identified by the fetch counter 28 is transferred to the buffer register 16. An "and" gate 38 in response to the $S_0$ state also passes the next clock pulse CP to count up the fetch counter 28 to the next sucecssive address in the program string stored in the memory 10.

With the control unit 22 advancing to the next control state $S_1$ by the clock pulse, the program syllable in the buffer register 16 is next transferred by means of a gate 40 in response to the $S_1$ state to the program register 20. The contents of the program register 20 are decoded by decoder circuit 42 which indicates whether the syllable type is a Value Call or an Operator type syllable.

Assuming for the moment that a Value Call type syllable has been placed in the program register 20, the control unit 22 is set by the next clock pulse to the $S_2$ state in response to the output of an "and" circuit 44 which senses the Value Call output of the decoder 42 and the $S_1$ state of the central control unit 22. In contrast to the arrangement described in the above-identified patent in which a Value Call syllable causes the operand to be placed in the top of the stack, the present invention results in the address of the operand being placed in the top of a stack memory. Thus during the execution of the Value Call syllable, the address of an operand is placed into a stack memory for addresses, hereinafter referred to as the #1 stack. The #1 stack is controlled by a #1 stack counter 46 which points to the address of the top of the stack in a portion of the core mmeory 10 set aside for the #1 stack. Since the address of the operand is identified by the Value Call syllable stored in the program register 20, this address information, including the base address and the length of the field of the operand is transferred by a gate 48 during the $S_2$ state from the program register 20 into the buffer register 16. At the same time, the address of the top of the #1 stack is transferred from the #1 stack counter 46 by means of a gate 50 into the address register 12. The gate 50 is controlled by applying the $S_2$ state through an "or" circuit 52 to the gate 50. The clock pulse generated at the end of the $S_2$ state is applied to the WRITE input 18 through a gate 53 to which the $S_2$ state is applied through an "or" circuit 54. As a result, the address information of the operand identified by the Value Call syllable is placed in the top of the #1 stack in the core memory 10. At the same time, the #1 stack counter 46 is advanced to the next stack address by means of a clock pulse passed by the gate 56 to which the $S_2$ control state is also applied. Since this completes the Value Call operation, the central control unit 22 is returned from the $S_2$ state back to the $S_0$ state at the next clock pulse time by applying the $S_2$ state to the "or" circuit 26.

During successive fetch operations, additional Value Call syllables may be encountered in the program string. Each Value Call syllable adds address information to the top of the #1 stack in memory 10 in the manner described above with the #1 stack counter being counted up as each address is added to the stack. However, when an Operator syllable is encountered, an entirely different mode of operation takes place.

Assuming an Operator syllable has been encountered during the fetch operation and placed in the program register 20, the decoder 42 in response to the Operator syllable sets the control unit 22 to the $S_3$ state directly from the $S_1$ state by means of an "and" circuit 58. The "and" circuit senses the Operator syllable condition of the decoder 42 and the $S_1$ state applied through an "or" circuit 82.

During the execution of an Operator syllable, it is necessary to transfer the operands identified by the top two addresses in the #1 stack respectively to an A-register 60 and a B-register 62 associated with an arithmetic unit 64. The arithmetic unit then stores the result in a second stack money, hereinafter called #2 stack. Since this is a character mode machine, the operands are transferred character by character or a group of characters at a time to the respective A-register and B-register from the memory. As each partial result is generated by the arithmetic unit 64, it is placed back into the #2 stack in the memory 10. After the result of the arithmetic operation is completed, a new address is placed in the top of the #1 stack pointing to the base address of the result in the #2 stack and also identifying the length of the field of the resultant operand.

To this end, the #1 stack counter 46 is initially counted down one during the $S_3$ state so that the #1 stack counter 46 will point to the last address placed in the top of the #1 stack in the memory 10. For this reason, the $S_3$ state is applied to an "and" gate 66 so that the next clock pulse is applied to count the #1 stack counter 46 down by one. The same clock pulse advances the central control unit 22 to the $S_4$ state.

During the $S_4$ state, the contents of the #1 stack counter are transferred through the gate 50 to the address register 12. The $S_4$ state is also applied to the gate 34 so as to cause a memory READ at the conclusion of the $S_4$ state, thereby placing the address and length information of one of the operands in the buffer register 16.

The information in the buffer register 16 at this point identifies the base address and the length of the first operand to enter into the operation identified by the Operator syllable in the program register 20. The base address is transferred to an A-address register 70 and the length of the operand is transferred to an A-length register 72. First, the A-length register 72 must be checked to determine if it is cleared, corresponding to an $A=0$ condition or if it is already loaded, corresponding to an $A\neq0$ condition. To this end, a decoding circuit 74 senses the condition of the register 72 and energizes either the $A=0$ output line or the $A\neq0$ output line. If the $A=0$ condition exists, as it should at this point in the operation since the A-length register 72 had not yet been loaded, the central control unit 22 is advanced to the $S_5$ state by the output of an "and" circuit 76 which senses that the central control unit 22 is in the $S_4$ state and that the $A=0$ condition pertains.

The $S_5$ state is applied to a gate 78 which transfers the base address information from the buffer register 16 to the A-address register 70. The $S_5$ state is applied to a gate 80 which transfers the operand length information from the buffer register 16 to the A-length register 72. At the completion of the $S_5$ state, the central control unit 22 is returned to the $S_3$ state by applying the $S_5$ state through the "or" circuit 82 to the "and" circuit 58, the output of the "and" circuit 58, as previously described, setting the central control unit 22 to the $S_3$ state with the next clock pulse.

During the $S_3$ state and the $S_4$ state, the above-described process is repeated in which the #1 stack counter 46 is counted down one and transferred to the address register 12 to bring the next address of an operand into the buffer register 16 in the reverse order in which the address was placed in the #1 stack. Since the A-length register 72 now contains length information, the $A\neq0$ ouput of the decoder 74 is true. This is used to advance the central control unit 22 from the $S_4$ state to the $S_6$ state in response to the output of an "and" circuit 84 which senses the $S_4$ state and the $A\neq0$ condition.

During the $S_6$ state, the base address portion of the word in the buffer register 16 is transferred by a gate 86 to a B-address register 88 while the length information portion of the word in the buffer register 16 is transferred by a gate 90 to a B-length register 92. Thus the base address and length information of two operands are now available to provide two operands from the memory 10 for the designated arithmetic operation. If the A-length register 72 is not 0, the central control unit 22 is advanced to the $S_7$ state. This is accomplished by the output of an "and" circuit 94 which senses the $A\neq0$ condition and the $S_6$ state.

During the $S_7$ state, the base address stored in the A-address register 70 is transferred by a gate 96 to the address register 12 and a memory readout cycle is initiated by the next clock pulse passed by the gate 34, resulting in the first character or group of characters of the designated operand being placed in the buffer register 16. The central control unit 22 then advances to the $S_8$ state.

During the $S_8$ state, the portion of the operand in the buffer register 16 is transferred by means of a gate 100 to the A-register 60. Also the address register 70 is counted up one to point to the next address location in memory by means of a clock pulse passed by a gate 102. The same pulse is used to count down the A-length register 72.

The central control unit 22 is now advanced to the $S_9$ state if the B-length register 92 is $B \neq 0$ as determined by a decoding circuit 104. An "and" circuit 106 senses the $B \neq 0$ condition and the $S_8$ state of the central control unit 22 as applied through an "or" circuit 107, the output of the "and" circuit 106 advancing the central control unit to the $S_9$ state with the next clock pulse.

During the $S_9$ state, the B-address register 88 is transferred by an "and" gate 108 to the address register 12 and a READ memory cycle is instituted, transferring the address portion of the second operand into the buffer register 16 by means of a clock pulse passed by the gate 34. The central control unit then advances to the $S_{10}$ state in which the contents of the buffer register 16 are transferred to the B-register 62 through an "and" gate 110, and the B-address register 88 is counted up one by the next clock pulse passed by an "and" gate 112. The B-length register 92 is counted down one by the same pulse.

The central control unit 22 advances from the $S_{10}$ to the $S_{11}$ state by the output of an "or" circuit 113. During the $S_{11}$ state, the contents of the A-register 60 are gated by a gate 114 to the arithmetic unit 64, and the contents of the B-regiser 62 are gated to the arithmetic unit by a gate 116. The arithmetic unit 64 in response to the output of the decoder 42 performs the designated arithmetic operation and the sub-result is stored back in the A-register 60 as well as in the buffer register 16.

The sub-result is then stored back in the top of the #2 stack of the memory 10. The address of the top of the #2 stack is identified by the contents of a #2 stack counter 118. The contents of the ≠2 stack counter 118 are added to the contents of an L-counter 120 which designates the length of the resultant. Initially, the contents of the L-counter 120 is 0 and therefore the output of an adder 122 coupled to the #2 stack counter 118 and the L-counter 120 corresponds to the base address of the #2 stack counter 118. This base address is transferred during the $S_{11}$ state by a gate 124 from the adder 122 through the "or" circuit 32 into the address register 12. The clock pulse at the end of the $S_{11}$ state is used to initiate a memory WRITE cycle by applying the $S_{11}$ state to the gate 54 associated with the memory 10. At the same time, the L-counter 120 is counted up one by a clock pulse passed by a gate 126 to which the $S_{11}$ state is applied.

At this point, if either the A-length register 72 or the B-length register 92 is not 0, the central control unit 22 returns either to the $S_7$ state under the $A \neq 0$ condition as sensed by the "and" circuit 94, or to the $S_9$ state in which $A=0$ and $B \neq 0$ as sensed by the "and" circuit 106 and the "and" circuit 130. Thus the next portions of the two operands identified by the A-address 70 and the B-address 88 are respectively transferred to the A-register 60 and the B-register 62 until both the A-length register 72 and the B-length register 92 are counted down to 0. Successive portions of the resultant are stored in successive addressable locations in the #2 stack in the memory 10. When both the A-length register 72 and the B-length register 92 are counted down to the 0 condition, the full field of both operands has been applied to the arithmetic unit 64 and the entire resultant field has been stored in successive locations in the #2 stack portion of the memory 10. The central control unit 22 is now advanced from the $S_{11}$ state to the $S_{12}$ state in response to the output of an "and" circuit 132 which senses that the $A=0$ and the $B=0$ conditions both obtain.

Druing the $S_{12}$ state, the base address in the #2 stack counter 118 is transferred by a gate 134 to the address section of the buffer register 16 and the length of the operand in the L-counter 120 is transferred by a gate 136 to the length portion of the word in the buffer register 16. Also during the $S_{12}$ state, the address in the #1 stack counter 46 is transferred by the gate 50 to the address register 12. Thus the clock pulse at the end of the $S_{12}$ state is used to write the address and length information into memory 10 from the buffer register 16. To this end, the $S_{12}$ state is applied to the gate 54 to initiate a WRITE cycle of the memory 10. The $S_{12}$ state is applied to the gate 56 so that the #1 stack counter 46 is then counted up one. At the same time, the L-counter 120 is reset to 0 by a clock pulse passed by a gate 140 to which the $S_{12}$ state is applied. The clock pulse at the end of the $S_{12}$ state replaces the contents of the #2 stack counter 118 with the output of the adder 122 applied through a gate 138. Thus the #2 stack counter 118 now points to the base address of the next operand to be placed on top of the #2 stack in the memory 10. The $S_{12}$ state is also applied to the "or" circuit 26 so that the central control unit 22 is returned to the $S_0$ state to permit the next program syllable to be fetched from memory into the program register 20.

It should be noted that either or both operands used in executing an Operator syllable may be prior resultant operands in the #2 stack portion of memory. The location of the operands, as pointed out, is derived from the #1 stack where the addresses are placed at the time the resultants are generated and stored. When a resultant operand in the #2 stack is used in executing an arithmetic operation, it is desirable that its location in memory be made available for storage of subsequent resultant operands. This may be accomplished, for example, by providing decoding means associated with the A-address and B-address registers 70 and 88 that sense when an address is within the field in memory set aside for the #2 stack. Such decoding means for the A-address and the B-address registers is indicated at 142 and 144 respectively. If the A-address is within the #2 stack portion of the memory, the output of an "and" circuit 146 during the $S_7$ state opens a gate 148, gating the address into the #2 stack counter 118. Similarly, if the B-address is within the #2 stack counter portion of the memory, the output of an "and" circuit 150 during the $S_9$ state opens a gate 152, gating the address into the #2 stack counter 118. This operation establishes the "top" of the #2 stack at the prior address.

Summarizing the operation, as the syllables forming the program string are transferred to the program register 20 in sequence under the address control of the fetch counter 28, they are decoded and executed. These syllables may be of two types, either a Value Call syllable or an Operation syllable. A Value Call syllable results in an address of the start of an operand and the length of the field of the operand being stored in the top of a first stack in the memory 10, the top of the stack being identified always by the #1 stack counter 46. A sequence of Value Call syllables results in a stacking of a sequence of corresponding operand addresses in the #1 stack.

When an Operator syllable is encountered, the top two addresses stored in the #1 stack are retrieved and used to readout two operands from memory character by character or by groups of characters to the arithmetic unit. The resultant of the arithmetic operation is placed in a second stack in the memory 10 identified by a #2 stack counter 118. The resultant is stored character by character or by groups of characters as the case may be. When the resultant is complete, the top two addresses in the #1 stack are replaced by a new address which points to the top of the #2 stack on a subsequent Operator syllable. This new address on the top of the #1 stack is used to locate the top of the #2 stack for reading out the resultant operand as one of the operands used in executing the next Operator syllable. By this arrangement, operands of any length may be used. Fixed field length is thus avoided in a stack memory type computer.

What is claimed is:

1. An internally programmed computer in which operands are of variable field length and the commands are of at least two types, the first type specifying in coded form the address and field length of an operand and the second type specifying an operation, the computer comprising addressible storage means, means for storing and fetching a group of commands in a predetermined sequence, means controlled in response to the first type of command when fetched from said storing means for transferring the address and field length portion of the command to the addressable storage means, said transferring means including means for addressing the storage means in a fixed predetermined order, an arithmetic unit for combining first and second operands and generating a resultant operand, means controlled in response to the second type of command for retrieving in the reverse of said predetermined order the previous two addresses and associated field length portions placed in the addressable storage means by said first type of command, and means responsive to the retrieving means for addressing the storage means and transferring the contents of the respective address locations to the arithmetic unit to generate a resultant operand.

2. Apparatus as defined in claim 1 further comprising means including an address register for storing the resultant operand in the storage means at the location specified by the contents of said address register, means for counting the length of the field of the resultant as it is stored in memory, and means for replacing in said predetermined addressing order the two address and associated field length portions retrieved from the storage means with the address and field length identified by said address register and counting means.

3. Apparatus as defined in claim 2 wherein the means for addressing the storage means in fixed predetermined order includes a counter, and means for advancing the counter in response to the execution of each of said first type of command.

4. Apparatus as defined in claim 3 wherein said retrieving means includes means for reducing the counter by one, and means for addressing the storage means from the counter after the counter is reduced.

5. Apparatus as defined in claim 4 further including means for resetting said address register with the address brought out of the storage means by said retrieving means when the address points to a resultant operand in the storage means.

References Cited

UNITED STATES PATENTS

| | | | |
|---|---|---|---|
| 3,047,228 | 7/1962 | Bauer et al. | 235—157 |
| 3,200,379 | 8/1965 | King et al. | 340—172.5 |
| 3,251,042 | 5/1966 | King | 340—172.5 |
| 3,293,616 | 12/1966 | Mullery et al. | 340—172.5 |
| 3,319,226 | 5/1967 | Mott et al. | 340—172.5 |
| 3,328,763 | 6/1967 | Rathbun et al. | 340—172.5 |

GARETH D. SHAW, Primary Examiner

R. F. CHAPURAN, Assistant Examiner